US008626891B2

(12) United States Patent
Guru et al.

(10) Patent No.: US 8,626,891 B2
(45) Date of Patent: Jan. 7, 2014

(54) CONFIGURED MANAGEMENT-AS-A-SERVICE CONNECT PROCESS BASED ON TENANT REQUIREMENTS

(75) Inventors: Chitra Guru, Bangalore (IN); Dinesh Tejmel Jain, Marunji (IN); Albee Jhoney, Bangalore (IN); Anbazhagan Mani, Bangalore (IN); Mandeep Panwar, Uttar (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/938,896

(22) Filed: Nov. 3, 2010

(65) Prior Publication Data

US 2012/0110156 A1    May 3, 2012

(51) Int. Cl.
*G06F 15/173*    (2006.01)

(52) U.S. Cl.
USPC ............................ 709/223; 707/769; 370/468

(58) Field of Classification Search
USPC ............................ 709/223; 370/468; 707/769
See application file for complete search history.

(56) References Cited

U.S. PATENT DOCUMENTS

| 5,204,897 | A  | * | 4/1993  | Wyman ........................ 710/200 |
| 5,613,089 | A  | * | 3/1997  | Hornbuckle .................. 711/164 |
| 5,925,127 | A  | * | 7/1999  | Ahmad .......................... 726/31 |
| 5,940,504 | A  | * | 8/1999  | Griswold ....................... 705/59 |
| 6,029,196 | A  |   | 2/2000  | Lenz ............................. 709/221 |
| 6,842,463 | B1 | * | 1/2005  | Drwiega et al. ............... 370/468 |
| 7,483,963 | B2 |   | 1/2009  | Zhang et al. .................. 709/220 |
| 7,949,684 | B2 | * | 5/2011  | Brooks et al. ................. 707/802 |
| 2003/0154168 | A1 | * | 8/2003 | Lautenbacher ................. 705/51 |
| 2004/0162900 | A1 |   | 8/2004 | Bucher et al. ................. 709/225 |
| 2005/0050174 | A1 |   | 3/2005 | Kung ............................ 709/220 |
| 2005/0188345 | A1 |   | 8/2005 | Chang et al. .................. 717/101 |
| 2008/0320081 | A1 |   | 12/2008 | Shriver-Blake et al. ...... 709/205 |
| 2009/0112734 | A1 | * | 4/2009 | Viehmann et al. .............. 705/27 |
| 2009/0187995 | A1 |   | 7/2009 | Lopatic .......................... 726/31 |
| 2009/0271324 | A1 | * | 10/2009 | Jandhyala et al. ............. 705/80 |
| 2010/0198730 | A1 | * | 8/2010 | Ahmed et al. .................. 705/50 |
| 2010/0250712 | A1 | * | 9/2010 | Ellison et al. ................. 709/219 |
| 2011/0093366 | A1 | * | 4/2011 | Nuggehalli et al. ........... 705/30 |
| 2011/0166952 | A1 | * | 7/2011 | Manchikanti et al. ....... 705/26.4 |
| 2011/0314042 | A1 | * | 12/2011 | Nuggehalli et al. .......... 707/769 |
| 2012/0054328 | A1 | * | 3/2012 | Brooks et al. ................. 709/223 |

FOREIGN PATENT DOCUMENTS

WO    WO 01/53914 A1    7/2001    ............... G06F 1/00
WO    WO 2007/030796    3/2007    ............. G06F 17/00

OTHER PUBLICATIONS

Nitu, "Configurability in SaaS (Software as a Service) Applications," http://portal.acm.org/citation.cfm?id=1506221, ISEC '09, Feb. 23-26, 2009, Pune, India.

(Continued)

*Primary Examiner* — Ario Etienne
*Assistant Examiner* — Michael C Lai
(74) *Attorney, Agent, or Firm* — VanLeeuwen & VanLeeuwen; Jeffrey S. LaBaw

(57) ABSTRACT

An approach is provided that configures a management-as-a-service (MaaS) connect process at a MaaS provider. The MaaS connect process is configured based on a request received from a MaaS tenant. The configured MaaS connect process is transmitted to the MaaS tenant. MaaS services are provided from the MaaS provider to the MaaS tenant. These MaaS services interact with the configured MaaS connect process installed at the MaaS tenant.

24 Claims, 14 Drawing Sheets

(56) References Cited

OTHER PUBLICATIONS

Sun et al., "Software as a Service: Configuration and Customization Perspectives," IBM China Research Lab, http://ieeexplore.ieee.org/xpl/freeabs_all.jsp?arnumber=4700495, 2008 IEEE Congress on Services Part II, 2008.

Kwok et al., "A Software as a Service with Multi-Tenancy Support for an Electronic Contract Management Application," IBM Research Division, http://ieeexplore.ieee.org/xpl/freeabs_all.jsp?arnumber=4578523, 2008 IEEE International Conference on Services Computing, 2008.

Turner et al., "Turning Software into a Service," Computer, Oct. 2003, vol. 36, No. 10.

* cited by examiner

CONFIGURED MANAGEMENT-AS-A-SERVICE CONNECT PROCESS BASED ON TENANT REQUIREMENTS

TECHNICAL FIELD

The present invention relates to providing a network-based administration console to manage collective intelligence of administrators.

BACKGROUND OF THE INVENTION

"Software as a Service" (SaaS) is a software delivery model where a software vendor develops a web-native software application hosts and operates (either independently or through a third-party) the application for use by its customers over a computer network, such as the Internet. Typical advantages of SaaS usually include the customers not taking title to the product, no inventory or logistics, no contractual reselling activity, no repair service, and usually no physical goods to install or connect. In the SaaS model, the customers generally do not pay for owning the software itself but instead pay a usage fee for using the product.

Some key characteristics of SaaS software generally include the following. First, SaaS generally provides network-based access to, and management of, commercially available (i.e., non-custom) software. Second, activities are generally managed from central locations rather than at each customer's site, thereby enabling customers to access applications remotely via a computer network, such as the Internet. Third, application delivery typically is closer to a one-to-many model (single instance, multi-tenant architecture) than to a one-to-one model, including architecture, pricing, partnering, and management characteristics. And fourth, SaaS provides centralized feature updating, which obviates the need for downloading patches and upgrades.

Management as a Service (MaaS) refers to offering IT Management Services using the SaaS delivery model. The consumers of the 'Management as a Service' are typically IT elements (such as, Server Nodes, Network elements, Storage servers, etc.). In this respect, MaaS differs from SaaS. A MaaS Provider refers to the service vendor, who offers IT Management Services using the SaaS delivery mode. The Maas Provider hosts the management services on a SaaS Platform and provides them remotely to a consumer over a network. A MaaS Tenant refers to the consumer of IT Management Services using the SaaS delivery model. The MaaS Tenant subscribes to the MaaS Provider for the Management services and consumes them remotely.

SUMMARY

An approach is provided that configures a management-as-a-service (MaaS) connect process at a MaaS provider. The MaaS connect process is configured based on a request received from a MaaS tenant. The configured MaaS connect process is transmitted to the MaaS tenant. MaaS services are provided from the MaaS provider to the MaaS tenant. These MaaS services interact with the configured MaaS connect process installed at the MaaS tenant.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
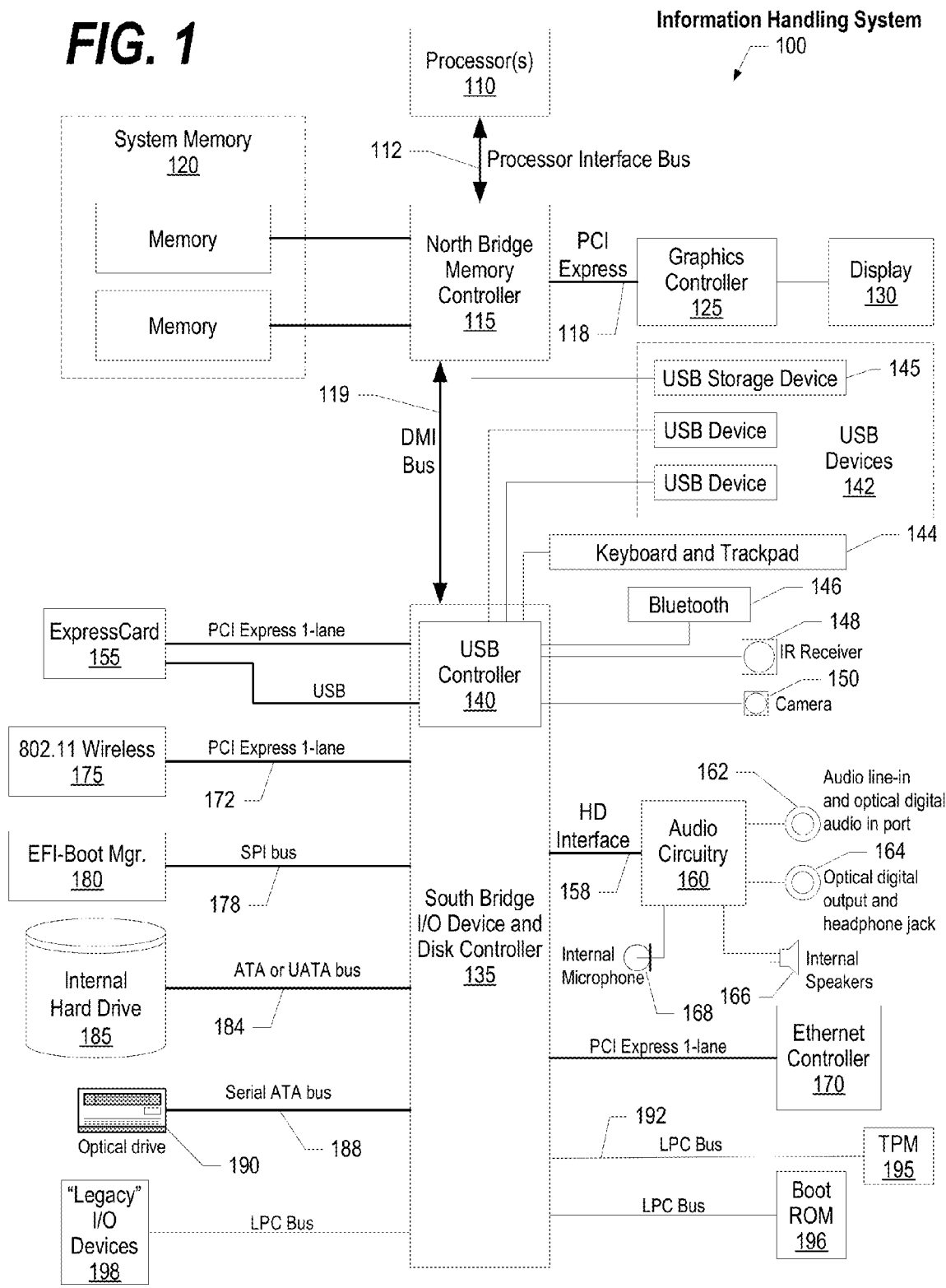
FIG. 1 is a block diagram of a data processing system in which the methods described herein can be implemented.
Figure 2:
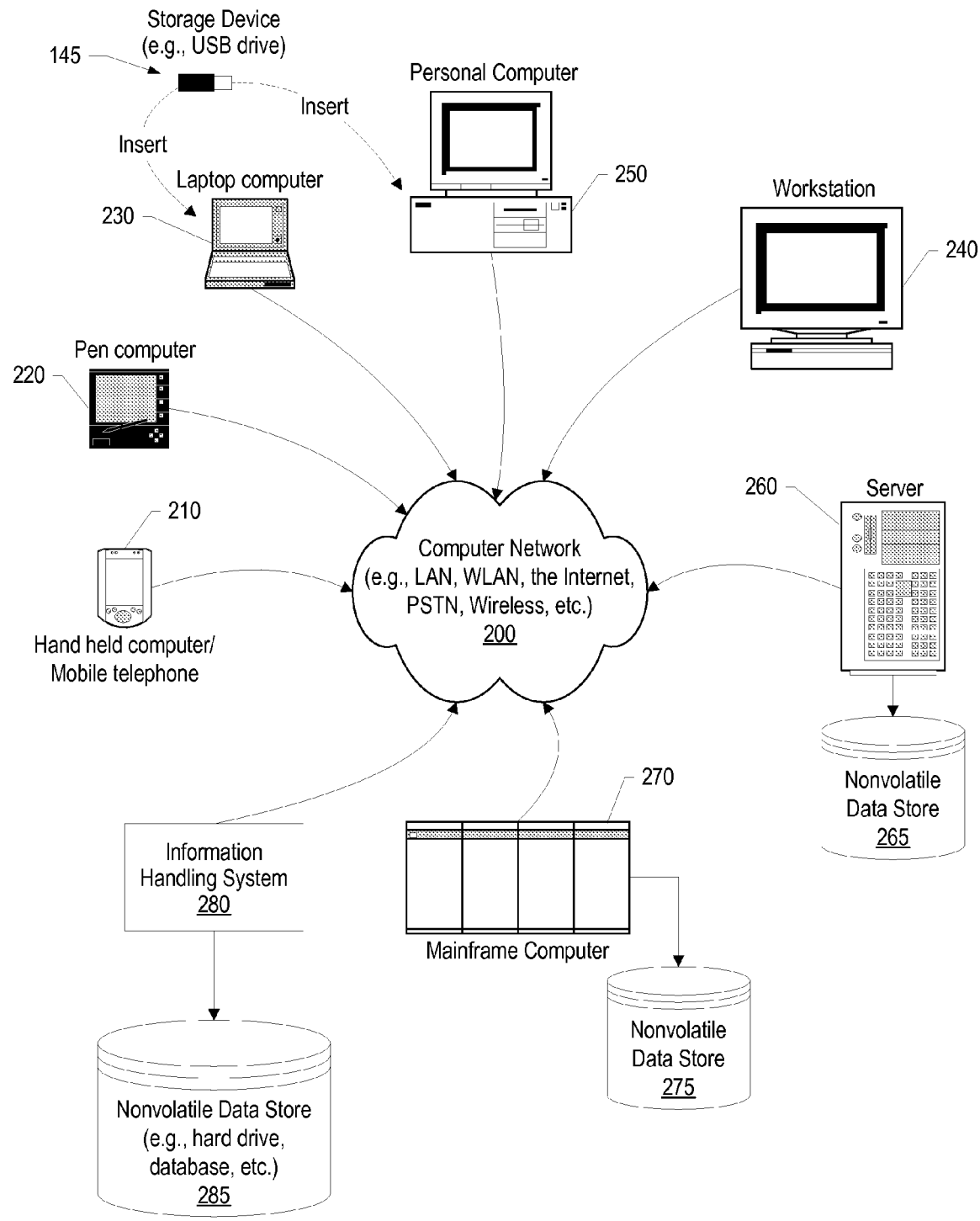
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
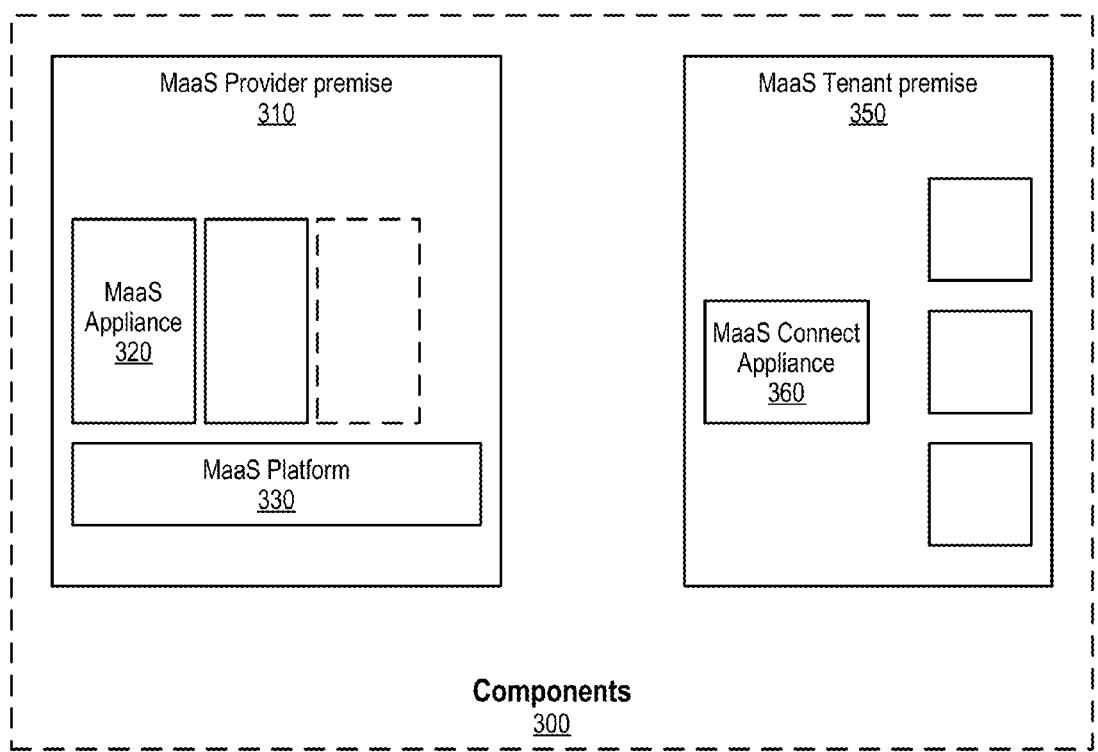
FIG. 3 is a high-level diagram showing components used to rapidly on-board a tenant in a Management as a Service (MaaS) Environment.

FIG. 3 is a high-level diagram showing components used to rapidly on-board a tenant in a Management as a Service (MaaS) Environment. Integration of the various architectural components 300 is shown. MaaS Tenant 350 refers to the client computer system that is a consumer of IT Management Services provided by MaaS Provider 310 using the SaaS delivery model described herein. The MaaS Tenant subscribes to the MaaS Provider for the Management services and consumes them remotely at the client's computer system. To overcome challenges faced in the prior art and to rapidly on-board a MaaS Tenant (350) on a multi-tenant MaaS environment, MaaS Provider 310 makes use of the following components as illustrated in FIG. 3:

MaaS Platform 330;
MaaS Appliance 320; and
MaaS Connect 360.

MaaS Platform 330, which might be an implementation of a SaaS Platform using the capabilities of System-p/AIX (such as LPAR, WPAR, VIOS, etc.), and using the capabilities from IBM Tivoli software (such as Tivoli Identity Manager, Tivoli Access Manager, Tivoli Usage & Accounting Manager, Tivoli Monitoring software, Tivoli Provisioning Manager, etc.). MaaS Platform 330 acts as a host for virtual appliances offering 'Management as a Service'.

MaaS Appliance 320 is a virtual-appliance (or pre-packaged image of IT management software). When installed on a "Software as a Service" (SaaS) Platform, MaaS Appliance 320 offers IT management services to a MaaS Tenant, such as MaaS tenant 350. MaaS Appliance 320 can be deployed on the SaaS Platform when the MaaS Tenant subscribes for the service. In one embodiment, MaaS Appliances 320 are AIX/WPAR images, which can be deployed within an AIX/LPAR (LPAR being a Logical Partition).

In addition, the MaaS Provider uses an application to execute in the MaaS Tenant to act as a proxy for the MaaS Services hosted on the MaaS Platform. MaaS Connect 360 is an appliance (or virtual appliance) deployed in MaaS Tenant premise 350 used to automate & accelerate the process of establishing the connectivity between the services offered by the MaaS Provider to the MaaS Tenant.

In one embodiment, MaaS Connect 360 is prepared by MaaS Provider 310, as an appliance or a downloadable virtual appliance (an application image, which can be played using a VM Player). In one embodiment, MaaS Connect 360 is auto-configured to securely connect with a MaaS Tenant, and acts as a gateway between MaaS Tenant premise and MaaS Provider premise. MaaS Tenant 350 uses MaaS Connect 360 (either physical appliance or downloaded virtual MaaS Connect Appliance):

to automatically discover and recommend the IT Management functions for the client environment;
to assess the current capacity required for each IT Management function (for example, the number-of-servers that must be monitored by the 'Monitoring Service');
to prepare the template contract that can be established with the MaaS Provider; and
to install the necessary agents and software that enables remote management of Tenant's IT infrastructure.

In one embodiment, MaaS Connect 360 the connectivity with IT Elements in MaaS Tenant premise 350, and the connectivity with MaaS Provider environment 310. In a further embodiment, MaaS Connect 360 also makes specific recommendations regarding upgrades to the network infrastructure that might be needed in order for the MaaS Tenant to consume the service. In some embodiments, MaaS Connect 360 acts as a service-proxy (for some MaaS Service), and supports offline activity.

Figure 4:
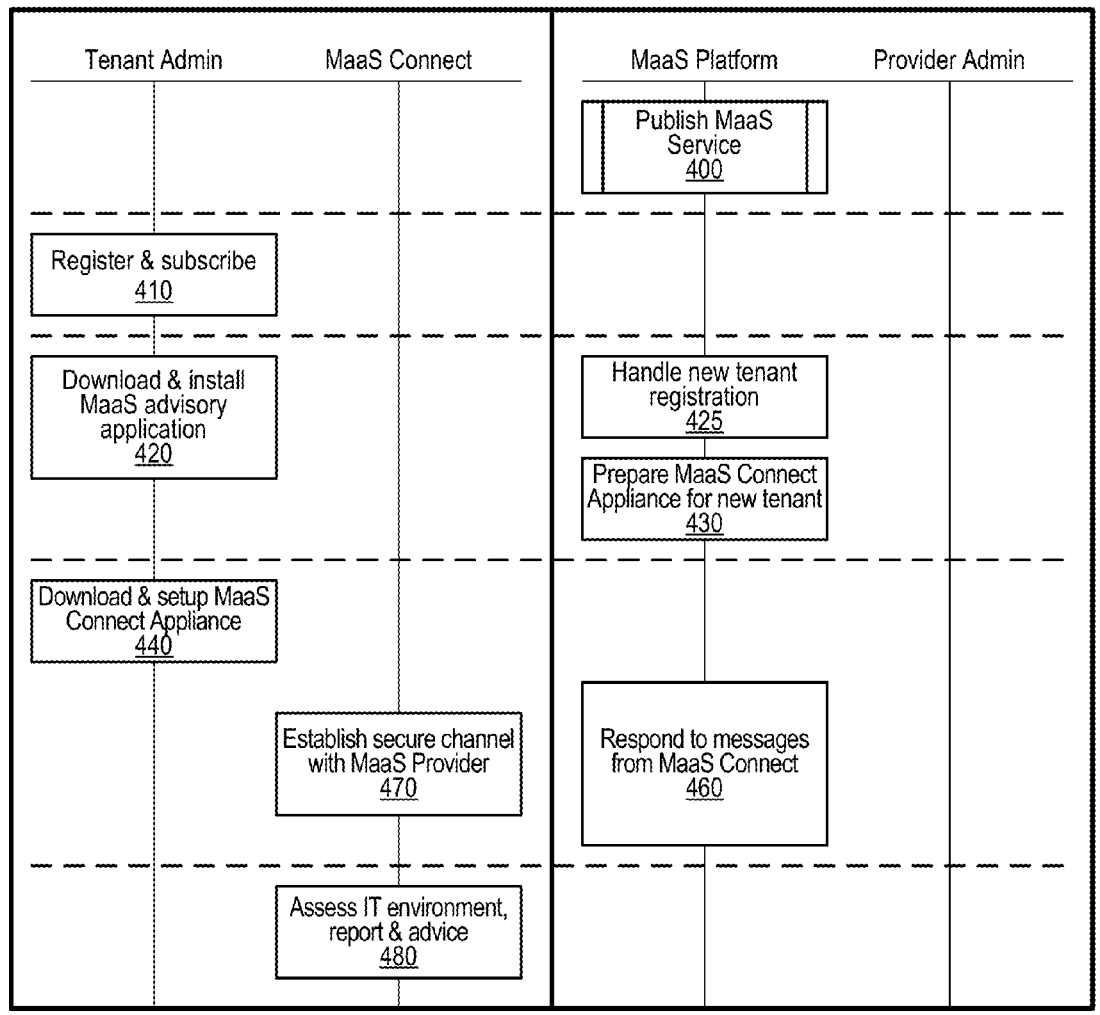
FIG. 4 is a first diagram showing steps performed by the MaaS Tenant Administrator, MaaS Connect, MaaS Platform & MaaS Provider Administrator.

FIG. 4 is a first diagram showing steps performed by the MaaS Tenant Administrator, MaaS Connect, MaaS Platform & MaaS Provider Administrator. Initially, the MaaS Provider maintains a repository of all MaaS Appliances and publishes a catalog of MaaS Services, in a web-site (step 400). At step 400, the MaaS Platform publishes the on-demand IT Management Service catalog. The repository of several MaaS Appliances (that offer IT Management Services such as, Monitoring Service, Incident Management Service, Service Request Management, etc.) is maintained by the MaaS Provider. The metadata of the MaaS Appliance describe the dependencies and the scripts that configure the MaaS Appliance instance.

A potential MaaS Tenant uses a web-browser to browse for these services and expresses an interest for consuming the IT Management Services offered by the MaaS Provider, by filling a registration form, e.g., using a web-browser (step 410). In one embodiment, some of the data inputs described herein maybe the result of user input to online or paper-based forms or the result of other user interfaces. In another embodiment, data inputs captured during a step such as the registration and subscribe step are performed automatically (e.g., by a process running on the client computer system, with the client computer system also referred to herein as the tenant). While registering, the potential MaaS Tenant specifies the desire to subscribe for MaaS Services, some details about the Service Configuration (such as number of servers to be monitored by the Monitoring service, etc.), and the desired subscription duration. At step 410, the MaaS Tenant Admin registers and subscribes for IT Management Service using a web-browser. During this step, the tenant browses the IT Management Service catalog and decides to consume services from the MaaS Provider. The decision is culminated by the tenant completing the subscription request form. In addition, the tenant selects the desired services, service-configuration (such as, the number of servers to be monitored by the Monitoring service, etc.), and the desired subscription duration. The tenant also saves the service-request identifier for further use. with the provider.

The MaaS Provider initiates the processing of the request from the potential MaaS Tenant at step 425. In the meantime, at step 420, the MaaS Tenant downloads and executes a MaaS Advisory application. The MaaS Advisory application will evaluate the tenant's IT Environment, connectivity between the MaaS Tenant & MaaS Provider to recommend the list of services that can be subscribed by the tenant, the preferred SLAs, and licensing scheme for each of the services. During step 420, the MaaS Advisory application evaluate the tenant's IT environment & recommends MaaS Service using MaaS Advisory. First, the MaaS Advisory application is downloaded to the tenant in order to evaluate the Tenant's IT Environment, and connectivity between the MaaS Tenant & MaaS Provider. Next, the MaaS Advisory application is executed to determine the Tenant's IT Environment and its connectivity to provider environment. During the execution of the MaaS Advisory application, the Tenant's IT Environment is discovered (using capabilities of products such as Tivoli Application Dependency Discovery Manager™) to populate a CMDB. In addition, the Tenant's IT Environment is monitored (for a short duration) for system-parameters, network-parameters, and middleware-parameters. The MaaS Advisory application also discovers and monitors the connectivity (and related parameters) for the existing network-connection between the MaaS Tenant & MaaS Provider. Execution of the MaaS Advisory application also includes a search of the MaaS Service catalog for the service predicate rules and evaluate each service predicate (using the discovered/monitored data) to shortlist the MaaS Service to be recommended for the MaaS Tenant. The service-configuration is determined for each short-listed MaaS Service, by evaluating the service-configuration recommendation rules (maintained with the service-catalog) using the discovered/monitored data. For example, the service-configuration recommendation rule for Monitoring service—will compute the number of servers to be monitored, etc. Finally, the MaaS Advisory application evaluates the usage-license recommendation rules (maintained with the service-catalog) to recommend the applicable SLA & usage-license schemes for each MaaS service recommended.

The MaaS Advisory will prepare the report such as the follows:

| | | MaaS Service Advisory | | |
|---|---|---|---|---|
| Item No. | IT Element | Quantity | Recommended Service(s) | Service configuration |
| 1. | Server | 15 | Server Monitoring Service Security Management Asset Management | — |
| 2. | Databases | 3 | Database Monitoring Service Capacity Management | — |
| 3. | J2EE App. Server | 8 | Composite Application Management | — |
| 4. | Desktop | 75 | Asset Management Incident Management | — |

| Item No. | Recommended Service(s) | Service Parameter |
|---|---|---|
| 5. | Storage Management | — |
| 6. | IT Advisory Service | |

| | License Advisory | | |
|---|---|---|---|
| Item No. | License | Recommended Service(s) | Rate Plan |
| 1. | Pre-paid Edition | Server Monitoring Service (for 0-20 servers) Asset Management (for up to 250 IT Elements) Incident Management (for up to 50 per month) Reports (for up to 4 per month) | Flat-rate: 200 USD pm Additional Server Monitoring: 10 USD per server . . . And so on . . . |
| 2. | Extended pre-paid edition | Server Monitoring Service (for 0-20 servers) Asset Management (for up to 250 IT Elements) Incident Management (for up to 50 per month) Reports (for up to 4 per month) Database monitoring (for 5 databases) Capacity Management (for 5 databases) | . . . . . . |

The MaaS Provider evaluates the details provided by the potential MaaS Tenant, to create a new server partition (AIX-LPAR) in the MaaS Platform. The size of the resource allocated to the LPAR is determined based on the registration details provided by the tenant. A base-profile image is loaded in the newly created LPAR with an operating system (AIX), the health monitoring agents, usage metering agents, an integrated management console, a database instance, etc.

This approach supports multi-tenancy of a hosted application (which was primarily designed for single-tenant purposes). The MaaS Provider creates a separate instance of the application (with dedicated resources) for each client using LPAR virtualization. The MaaS Provider shares the physical resources by dynamically allocating an LPAR to a tenant based on requirements. The shared resources include Hard-disk, CPU, memory, I/O, etc. In one embodiment, the usage of resources allocated to a tenant is continuously monitored. If necessary, these resources can be dynamically increased or decreased as per the real time changes in the tenant's requirement.

Returning to step 425, the MaaS Platform handles the new tenant registration. The MaaS Platform evaluates the Tenant's subscription request to determine the size of resources that needs to be allocated for the new tenant, creates a new LPAR (on the System-p/AIX) for the tenant, using a File-Backed-Device; and configure the LPAR with virtual I/O and virtual storage (depending on the Tenant classification—such as Platinum. Gold, & Bronze), and loads a base profile image in the MaaS Tenant's LPAR; this includes the operating system (AIX), the health monitoring agents, usage metering agents, a integrated management console, a database instance, etc. A default set of MaaS Appliances (WPAR images) are loaded on to the newly created MaaS Tenant LPAR, which correspond to a default set of services offered to the MaaS Tenant.

At step 430, the MaaS Connect appliance is prepared, by the MaaS Platform, for the new tenant. The results of the execution of the MaaS Advisory application acts as an advisory (input) for the MaaS Tenant, while deciding to consume the services (or subscribe for the services) offered by the MaaS Provider. The MaaS Provider prepares a MaaS Connect for the new MaaS Tenant. The MaaS Connect is available as an Appliance (to be physically installed in the MaaS Tenant environment) or as a Virtual Appliance (to be installed on an existing hardware using virtualization techniques).

The MaaS Connect appliance acts as a gateway for interaction between the MaaS Tenant's IT environment and the MaaS Provider. It is used to establish a secure channel of communication between the MaaS Tenant & MaaS Provider. It sometime acts as a service-proxy (for some MaaS Service), and supports off-line activity. The MaaS Provider configures the MaaS Connect to uniquely identify the MaaS Tenant and to securely initiate connection to the MaaS Tenant's LPAR from the MaaS Tenant's network. If the MaaS Tenant chose to use the MaaS Connect physical appliance, then prepare the MaaS Connect physical appliance for deployment in the MaaS Tenant premise. If the MaaS Tenant chose to use MaaS Connect virtual appliance, then prepare the MaaS Connect virtual appliance for download, and send the URL, user-id & password (for securely downloading the MaaS Connect Image) to the Tenant Administrator by eMail.

In preparing the MaaS Connect appliance, the MaaS Platform configures the MaaS Connect appliance to uniquely identify the MaaS Tenant and to securely initiate connection to the MaaS Tenant's LPAR from the MaaS Tenant's network. If the MaaS Tenant chose to use the MaaS Connect physical appliance, then the MaaS Platform prepares the MaaS Connect physical appliance for deployment in the MaaS Tenant premise. On the other hand, if the MaaS Tenant chose to use a MaaS Connect virtual appliance, then the MaaS Platform prepares the MaaS Connect virtual appliance for download and execution in a dedicated machine using a VM Player, copies the MaaS Connect virtual appliance to the download-location, and sends the URL, user-id & password (for securely downloading the MaaS Connect Image) to the Tenant Administrator via eMail.

At step 440, the MaaS Tenant sets up the MaaS Connect gateway by either installing the physical appliance or download the MaaS Connect virtual appliance, using the URL provided in the eMail, using the user-id & password.

The MaaS Tenant starts the MaaS Connect application, which firstly locally authenticates the user executing the MaaS Connect, using the user-id & password. Further, MaaS Connect will challenge the tenant-administrator for the service-request id/product-key.

The MaaS Connect application obtains the tenant & user details—for registration validation and prompts the user to provide the new security credentials (digital identity or user-id/password) at first-use. The MaaS Connect sends the MaaS Connect appliance details to the MaaS Provider and the tenant & user registration details over the Internet.

At steps 460 and 470, the MaaS Connect and MaaS Provider establish secure interaction channel between the MaaS Tenant & MaaS Provider by exchanging the security credentials. MaaS Connect sends the tenant's security credentials to the MaaS Provider and request to cross-certify. Similarly, MaaS Provider sends the security credentials to the MaaS Tenant to cross-certify.

At step 480, the MaaS Connect re-runs the MaaS Advisory application to assess the tenant's IT environment and prepare a MaaS Advisory report. The MaaS Advisory report is sent to the MaaS Provider to evaluate the tenant's data and assess the provider-side environment and prepare a draft copy of the MaaS Service Contract.

During step 480, the MaaS Advisory component of MaaS Connect assesses the tenant's IT environment, and provides a report and advice. The MaaS Advisory discovers and assess the health/capacity of the Tenant IT Environment by scanning the IT environment in the MaaS Tenant Premise using an agent-less discovery application, to determine the IT Elements, Network elements and the topology (this can be achieved by IBM Tivoli Application Dependency Discovery Manager™) including the following: (i) server (and its configurations); (ii) desktops; (iii) routers; and network configuration. The MaaS Advisory also takes snap-shot of the health of the IT Environment using the vital-signs of each of the IT/Network elements and prepares a report, summarizing the state of the IT Environment. In addition, the MaaS Advisory discovers and assesses the health/capacity of the connectivity between the MaaS Tenant & MaaS Provider as well as discovering the network routes between the MaaS Tenant and MaaS Provider, and measuring the snap-shot network performance, for each route. The MaaS Advisory scores the connectivity between MaaS Tenant and MaaS Provider, summarizes and reports the state of connectivity between MaaS Tenant and MaaS Provider. In generating an Advisory for the MaaS Tenant, the MaaS Advisory evaluates the IT Environment in the MaaS Tenant and recommends services that can be consumed by the tenant, assesses the connectivity between the MaaS Tenant and the MaaS Provider and recommends changes in the network configuration to improve the score. The MaaS Advisory sends the reports and recommendations to the MaaS Provider to prepare template MaaS Service Contract. This includes sending the MaaS Tenant IT environment health-report, the MaaS Tenant-MaaS Provider connectivity health-report, the MaaS service recommendations, and the MaaS Tenant connectivity-score improvement recommendations.

Figure 5:
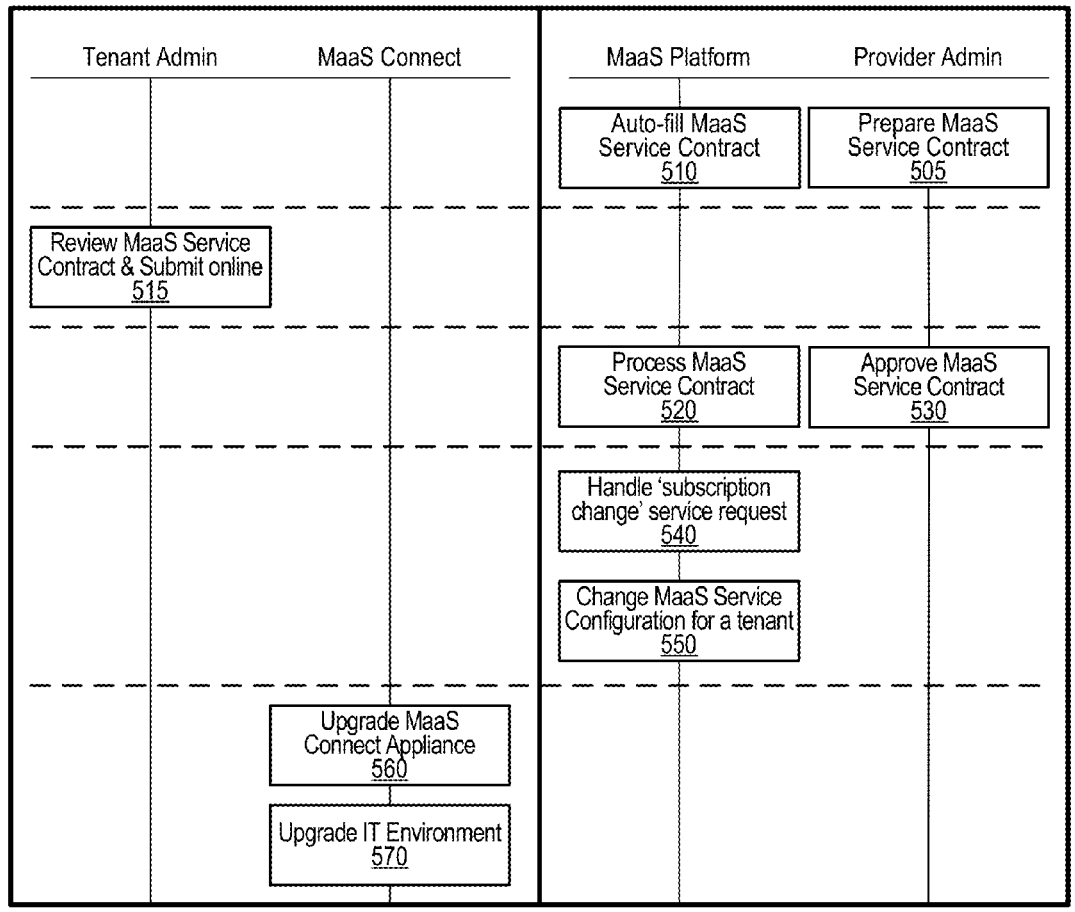
FIG. 5 is a second diagram showing steps performed by the MaaS Tenant Administrator, MaaS Connect, MaaS Platform & MaaS Provider Administrator.

FIG. 5 is a second diagram showing steps performed by the MaaS Tenant Administrator, MaaS Connect, MaaS Platform & MaaS Provider Administrator. At step 500, the MaaS Provider chooses the appropriate MaaS Service Contract (e.g., an XForm) template based on the classification of the MaaS Tenant (Platinum, Gold, Silver, & Bronze). The MaaS Service Contract Form is auto-filled with the list of MaaS Service copied from the MaaS Advisory report. At step 505, the Provider Admin prepares the MaaS Service Contract Form. The service-configuration, and SLAs, are also automatically filled. The MaaS Service Contract Form also enlists the common facilities and other general purpose services (such as Storage Services) provided by MaaS Provider. Finally, the MaaS Service Contract Form enlists all the recommended usage-license models based on the desired services, service-configuration and the desired subscription duration. The MaaS Tenant Administrator chooses the appropriate license-model before digitally signing the MaaS Service Contract.

During step 505, the Provider Admin prepares a MaaS Service contract. This step involves preparation of the base-contract section as an XForm. A contract template is chosen depending on the classification of the MaaS Tenant (e.g., Platinum, Gold, Silver, Bronze, etc.). The Provider Admin refines the SLAs based on (a) the server configuration of the MaaS Connect Appliance; and (b) the connectivity score between the MaaS Tenant & MaaS Provider.

During step 510, the MaaS Platform auto-fills the MaaS Service Contract. This step includes auto-filling the IT Management section of the service contract which includes enlisting the MaaS Services that are being provided by the MaaS Provider and the corresponding IT elements (in the MaaS Tenant premise) which can consume the service as well as enlisting the general purpose services (such as Storage Services) that are being provided by the MaaS Provider. Step 510 also includes auto-filling of the License section of the MaaS Service contract. Here, the usage-license model is suggested based on the information gathered as described above, such as when the MaaS Tenant chose the desired services in step 410 shown in FIG. 4.

At step 515, the MaaS Tenant reviews the MaaS Service Contract online and digitally sign each page in the form—base-contract section, IT Management service contract section, common facilities. The MaaS Tenant finally reviews usage-license options, choose the usage-license scheme and the payment modes and digitally sign the license section of the service-contract.

At step 520, the MaaS Platform processes the MaaS Service contract received from the MaaS Tenant. The MaaS Platform verifies the digital signature in the base-contract section, and approves and embeds the signature (of MaaS Provider signatory) in the base-contract section. The MaaS Platform verifies the digital signature in the IT Management service contract section, verifies the choice of MaaS services (and the corresponding IT Elements that will consume the service); and verifies the choice of general purpose services (such as Storage Services). The MaaS Platform raises a service-request to provision the requested MaaS Services and operational support for the new Tenant (to the operational support (OSS)), and approves and embeds the digital-signature (of MaaS Provider signatory) in the IT Management Service section of the contract.

At step 530, the MaaS Provider Admin verifies the signature in the usage-license section of the contract, raises a service-request to initiate the provisioning of business-support for the new MaaS Tenant (to the business support (BSS)), and approves and embeds the digital-signature (of MaaS Provider signatory) in the license section of the contract.

After the MaaS Service contract is established, at various times the tenant may request changes to the subscriptions. At step 540, the MaaS Provider handles the service-request raised by the MaaS Tenant to change the subscriptions. The MaaS Provider first verifies the availability of resources in the Tenant's LPAR, to load/change the MaaS Appliance, verifies dependencies in the Tenant's LPAR to load/change the MaaS Appliance. At step 550, the MaaS Platform changes the MaaS Service Configuration for the tenant. Step 550 includes retrieving the relevant MaaS Appliance from the repository and loading them in the Tenant's LPAR, configuring each MaaS Appliance to establish database, network and application connectivity, preparing the upgrades to MaaS Connect in order to cater to the changes in the MaaS Services subscribed by the MaaS Tenant, and notifying the tenant's MaaS Connect to re-configure itself, in order to handle the changes in the MaaS Service subscription.

At step 560, the tenant's MaaS Connect upgrades itself by downloading the updated MaaS Connect configuration list from the server, evaluating this MaaS Connect configuration list with the current configuration of MaaS Connect, to determine the change-list, and performing the operations suggested by each change-item in the change-list. These operations might include:

installing additional service-proxies, or
removing existing service-proxies, or
upgrading the currencies of existing service-proxies.

In addition, during step 560, the MaaS Connect monitors and reports the status of the changes made in the MaaS Connect back to the MaaS Provider.

At step 570, the MaaS Connect upgrades the tenant's IT environment. This step includes preparing the MaaS Tenant IT Environment according to changes in the service-configuration changes, downloading the new service-configuration list from the server, evaluating this service-configuration list, with the existing service-configurations, to determine the service-configuration change-list, and performing the operations suggested by each change-item in the change-list. These operations might include:

deploying new agents remotely onto the new IT elements, or
remove existing agents from the IT elements; or
upgrading existing agents in the IT elements.

In addition, during step 560, the MaaS Connect monitors and reports the status of the changes made in the tenant's IT Environment back to the MaaS Provider.

Figure 6:
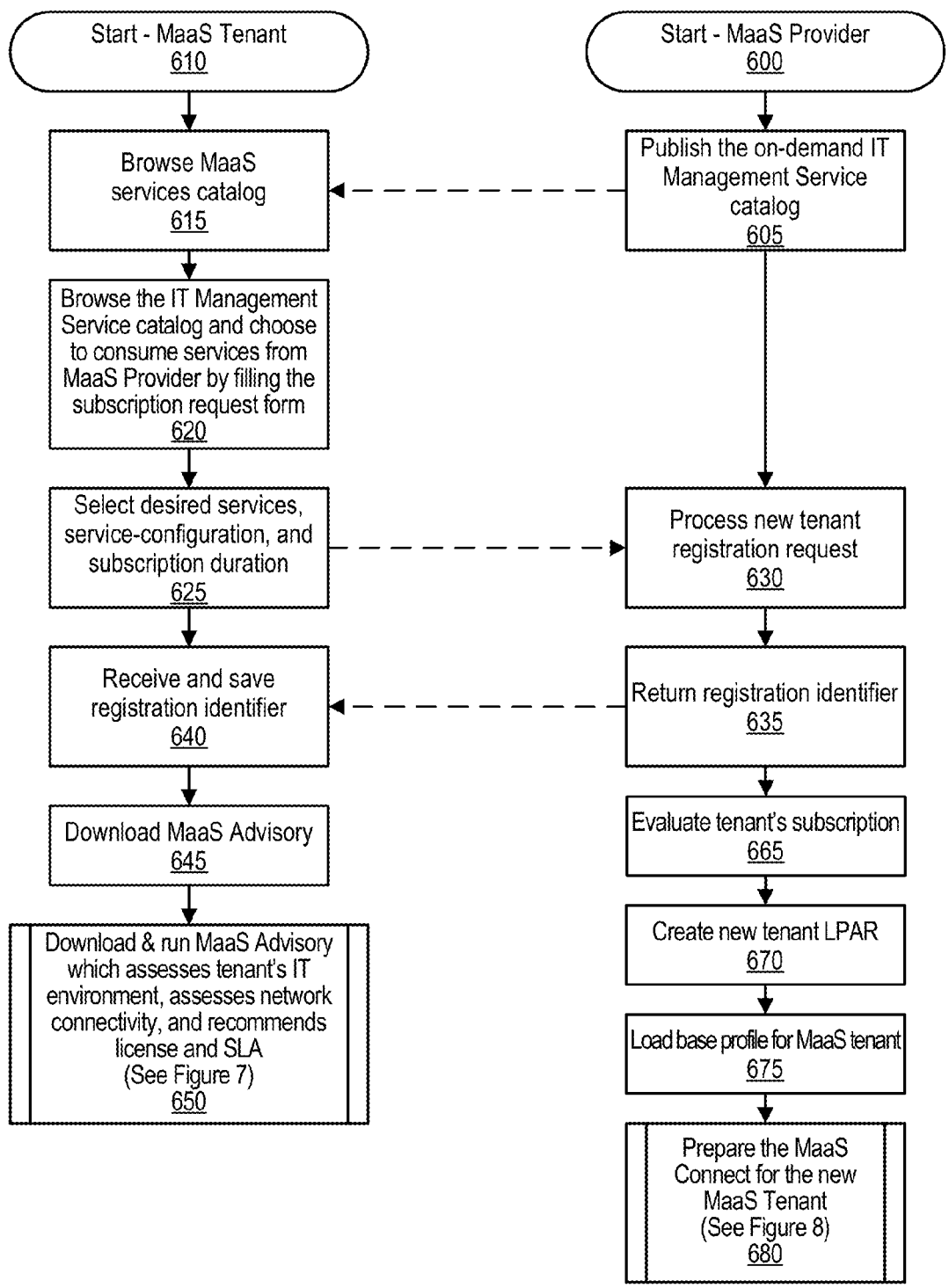
FIG. 6 is a flowchart showing initial interaction steps between a MaaS tenant and a MaaS provider.

FIG. 6 is a flowchart showing initial interaction steps between a MaaS tenant and a MaaS provider. MaaS Provider processing commences at 600 whereupon, at step 605, the MaaS Provider publishes its on-demand IT services catalog available to clients (tenants). MaaS Tenant processing is shown commencing at 610, whereupon, at step 615, the MaaS Tenant browses the MaaS services catalog. At step 620, the MaaS Tenant chooses to consume services offered by the MaaS Provider. The MaaS Tenant notes the selections by filling out a subscription request form. At step 625, the MaaS Tenant selects the desired services, service configuration, and subscription duration and this information is communicated to the MaaS Provider as a new tenant registration request. At step 630, the MaaS Provider processes the new tenant registration request and, at step 635, the MaaS Provider returns a registration identifier to the MaaS Tenant. At step 640, the MaaS Tenant receives the registration identifier from the MaaS Provider and saves the identifier for future use. At step 645, the MaaS Tenant downloads the MaaS Advisory application and, at predefined process 650, the MaaS Tenant downloads and executes the MaaS Advisory application which assesses the tenant's IT environment, assesses network connectivity, and recommends a license and a SLA (see FIG. 7 and corresponding text for processing details).

Returning to MaaS Provider processing, after returning the registration identifier to the MaaS Tenant, at step 665, the MaaS Provider evaluates the tenant's subscription request. At step 670, the MaaS Provider creates a new tenant LPAR, and at step 675, the MaaS Provider loads a base profile for the MaaS tenant into the created LPAR. At predefined process 680, the MaaS Provider prepares the MaaS Connect appliance for the new MaaS Tenant (see FIG. 8 and corresponding text for processing details).

Figure 7:
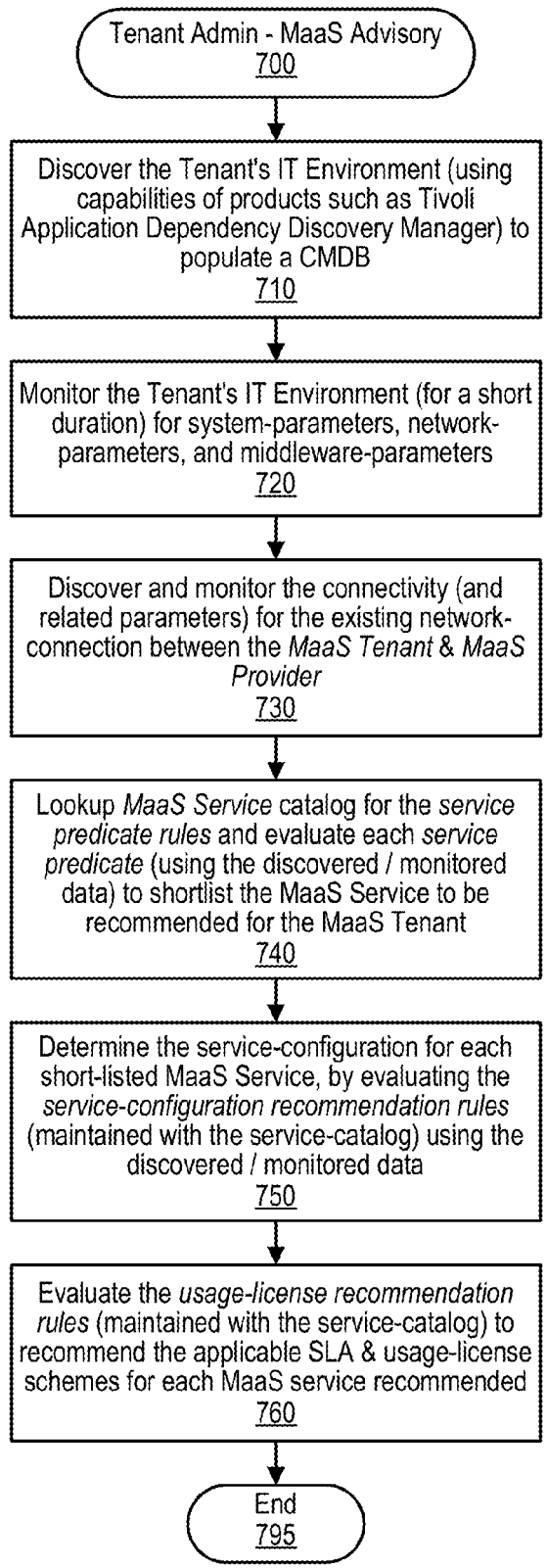
FIG. 7 is a flowchart showing steps taken by tenant administration during MaaS advisory processing.

FIG. 7 is a flowchart showing steps taken by tenant administration during MaaS advisory processing. This processing is called from predefined process 650 shown in FIG. 6. Returning to FIG. 7, processing commences at 700 whereupon, at step 710 the MaaS Advisory application discovers the tenant's IT environment (using capabilities of products such as Tivoli Application Dependency Discovery Manager™) to populate a CMDB. At step 720, the MaaS Advisory application monitors the Tenant's IT environment (for a short duration) for system-parameters, network-parameters, and middleware-parameters. At step 730, the MaaS Advisory application discovers and monitors the connectivity (and related parameters) for the existing network-connection between the MaaS Tenant and the MaaS Provider. At step 740, the MaaS Advisory application searches the MaaS Service catalog for the service predicate rules and evaluate each service predicate (using the discovered/monitored data) to shortlist the MaaS Service to be recommended for the MaaS Tenant. At step 750, the MaaS Advisory application determines the service-configuration for each short-listed MaaS Service, by evaluating the service-configuration recommendation rules (maintained with the service-catalog) using the discovered/monitored data. Finally, at step 760, the MaaS Advisory application evaluates the usage-license recommendation rules (maintained with the service-catalog) to recommend the applicable SLA & usage-license schemes for each MaaS service recommended. Processing by the MaaS Advisory application thereafter ends at 795.

Figure 8:
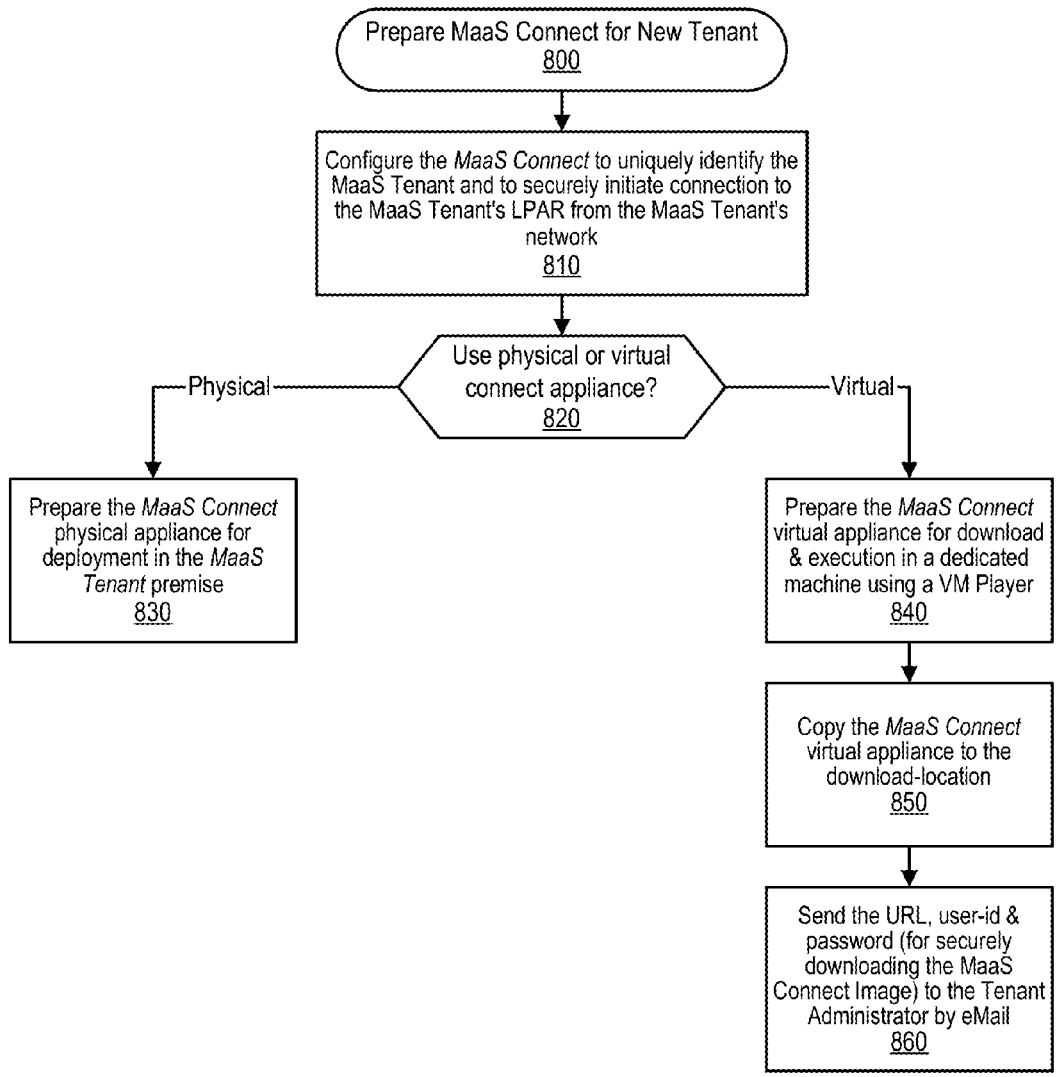
FIG. 8 is a flowchart showing steps taken to prepare the MaaS Connect for a new tenant.

FIG. 8 is a flowchart showing steps taken to prepare the MaaS Connect for a new tenant. Processing commences at 800 whereupon, at step 810, the MaaS Provider configures the MaaS Connect appliance to uniquely identify the MaaS Tenant and to securely initiate connection to the MaaS Tenant's LPAR from the MaaS Tenant's network. A decision is made as to whether a physical or virtual MaaS Connect appliance is being used. If a physical MaaS Connect appliance is being used, then decision 820 branches to the "physical" branch whereupon, at step 830, the MaaS Provider prepares the MaaS Connect physical appliance for deployment in the MaaS Tenant premise. On the other hand, if a virtual MaaS Connect appliance is being used, then decision 820 branches to the "virtual" branch, whereupon, at step 840, the MaaS Provider prepares the MaaS Connect virtual appliance for download and execution in a dedicated machine using a VM Player. At step 850, the MaaS Provider copies the MaaS Connect virtual appliance to the download-location, and at step 860, the MaaS Provider sends the URL, user-id and password (for securely downloading the MaaS Connect Image) to the Tenant Administrator via eMail.

Figure 9:
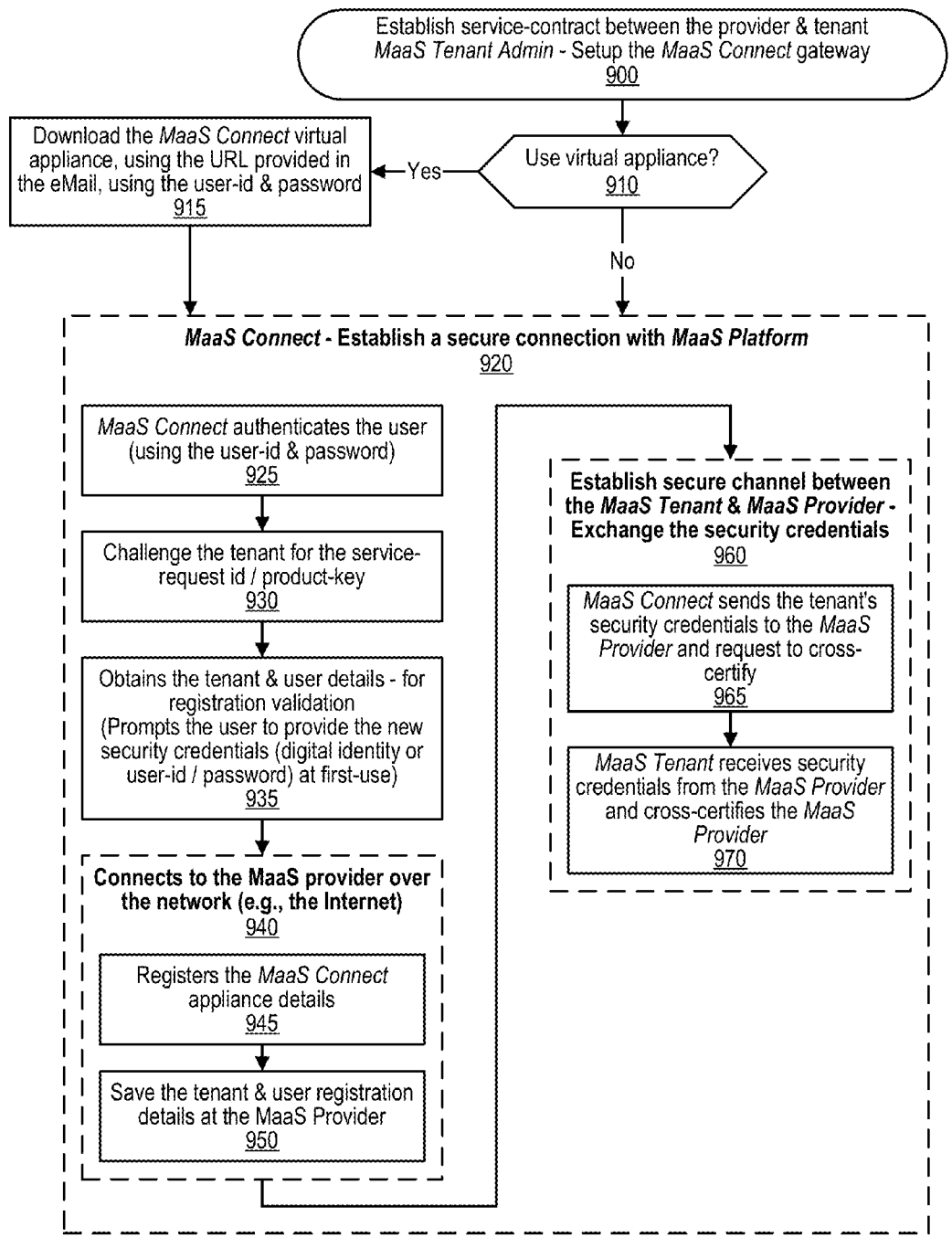
FIG. 9 is a flowchart showing steps taken to establish service-contract between the provider and tenant and to setup the MaaS Connect gateway.

FIG. 9 is a flowchart showing steps taken to establish service-contract between the provider and tenant and to setup the MaaS Connect gateway. Processing commences at 900 whereupon a decision is made as to whether a virtual MaaS Connect appliance is being used (decision 910). If a virtual MaaS Connect appliance is being used, then decision 910 branches to the "yes" branch whereupon, at step 915, the MaaS Connect appliance is downloaded using the URL provided by the MaaS Provider (e.g., in an email sent to the MaaS Tenant) and the MaaS Tenant uses the previously provided user identifier and password. On the other hand, if a virtual MaaS Connect appliance is not being used, then decision 910 branches to the "no" branch bypassing step 915.

At 920, the MaaS Connect appliance establishes a secure connection with the MaaS Platform using the steps shown. At step 925, the MaaS Connect appliance authenticates the user using the user identifier and password supplied by the user (the user identifier and password being previously provided to the user by the MaaS Provider when the MaaS tenant registered for the services). At step 930, the tenant is prompted (challenged) for the service request identifier and/or the product key corresponding to the subscribed services. At step 935, the MaaS Connect appliance obtains the tenant and user details that will be used to validate the registration. In one embodiment, the MaaS Connect prompts the user to provide the new security credentials, such as a digital identity or user identifier/password) upon the first use of the services by the tenant.

At 940, the MaaS Connect appliance connects to the MaaS Provider over the computer network, such as the Internet using the steps shown. At step 945, the MaaS Connect appliance details are registered with the MaaS Provider and, at step 950, the tenant and user registration details are saved at the MaaS Provider.

At step 960, a secure channel is established between the MaaS Tenant and the MaaS Provider by exchanging security credentials using the steps shown. At step 965, the MaaS Connect appliance sends the tenant's security credentials to the MaaS Provider with a request to cross-certify. At step 970, the MaaS Tenant receives the security credential from the MaaS Provider and cross-certifies the MaaS Provider. At this point, once the security credentials are certified, a secure connection is established between the MaaS Tenant and the MaaS Provider.

Figure 10:
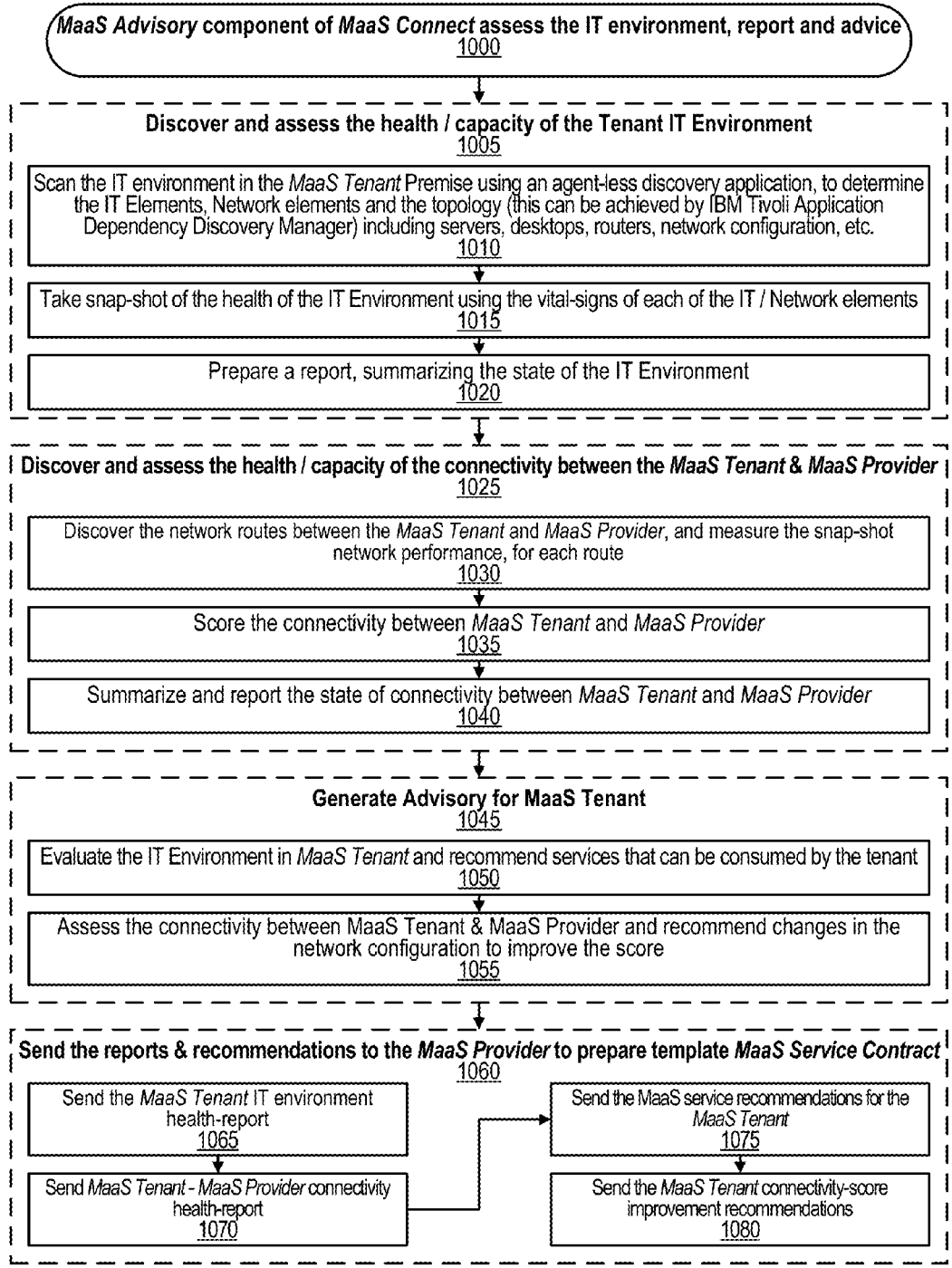
FIG. 10 is a flowchart showing steps taken by MaaS advisory component of the MaaS Connect to assess the tenant's IT environment, report the assessment, and provide advice.

FIG. 10 is a flowchart showing steps taken by MaaS advisory component of the MaaS Connect to assess the tenant's IT environment, report the assessment, and provide advice. Processing commences at 1000 whereupon at 1005 the MaaS Advisory component discovers and assesses the health and capacity of the Tenant IT environment using the steps shown. At step 1010, the MaaS Advisory component scans the tenant IT environment in the MaaS Tenant Premise using an agent-less discovery application. This is done to determine the IT Elements, Network elements and the topology (this can be achieved by IBM Tivoli Application Dependency Discovery Manager™) including servers, desktops, routers, network configuration, etc. At step 1015, the MaaS Advisory component takes a snap-shot of the health of the IT Environment using the vital-signs of each of the IT/Network elements discovered in step 1010. Finally, at step 1020, the MaaS Advisory component prepares a report summarizing the state of the tenant's IT environment.

Next, at 1025, the MaaS Advisory component discovers and assesses the health and capacity of the connectivity between the MaaS Tenant and the MaaS Provider using the steps shown. At step 1030, the MaaS Advisory component discovers the network routes between the MaaS Tenant and the MaaS Provider. In addition, the MaaS Advisory component measures the snap-shot network performance for each route. At step 1035, the MaaS Advisory component scores the connectivity between MaaS Tenant and MaaS Provider. At step 1040, the MaaS Advisory component summarizes and reports the state of connectivity between MaaS Tenant and MaaS Provider.

Next, at 1045, the MaaS Advisory component generates an advisory for the MaaS Tenant using the steps shown. At step 1050, MaaS Advisory component evaluates the IT Environment in MaaS Tenant and recommends services that can be consumed by the tenant. At step 1055, MaaS Advisory component assesses the connectivity between the MaaS Tenant and the MaaS Provider and recommends changes in the network configuration to improve the score.

At 1060, the MaaS Advisory component sends the reports and recommendations to the MaaS Provider in order to prepare a template MaaS Service Contract using the steps shown. At step 1065, the MaaS Advisory component sends the MaaS Tenant IT environment health-report to the MaaS Provider. At step 1070, the MaaS Advisory component sends the MaaS Tenant—MaaS Provider connectivity health-report to the MaaS Provider. At step 1075, the MaaS Advisory component sends the MaaS service recommendations for the MaaS Tenant to the MaaS Provider. Finally, at step 1080, the MaaS Advisory component sends the MaaS Tenant connectivity-score improvement recommendations to the MaaS Provider.

Figure 11:
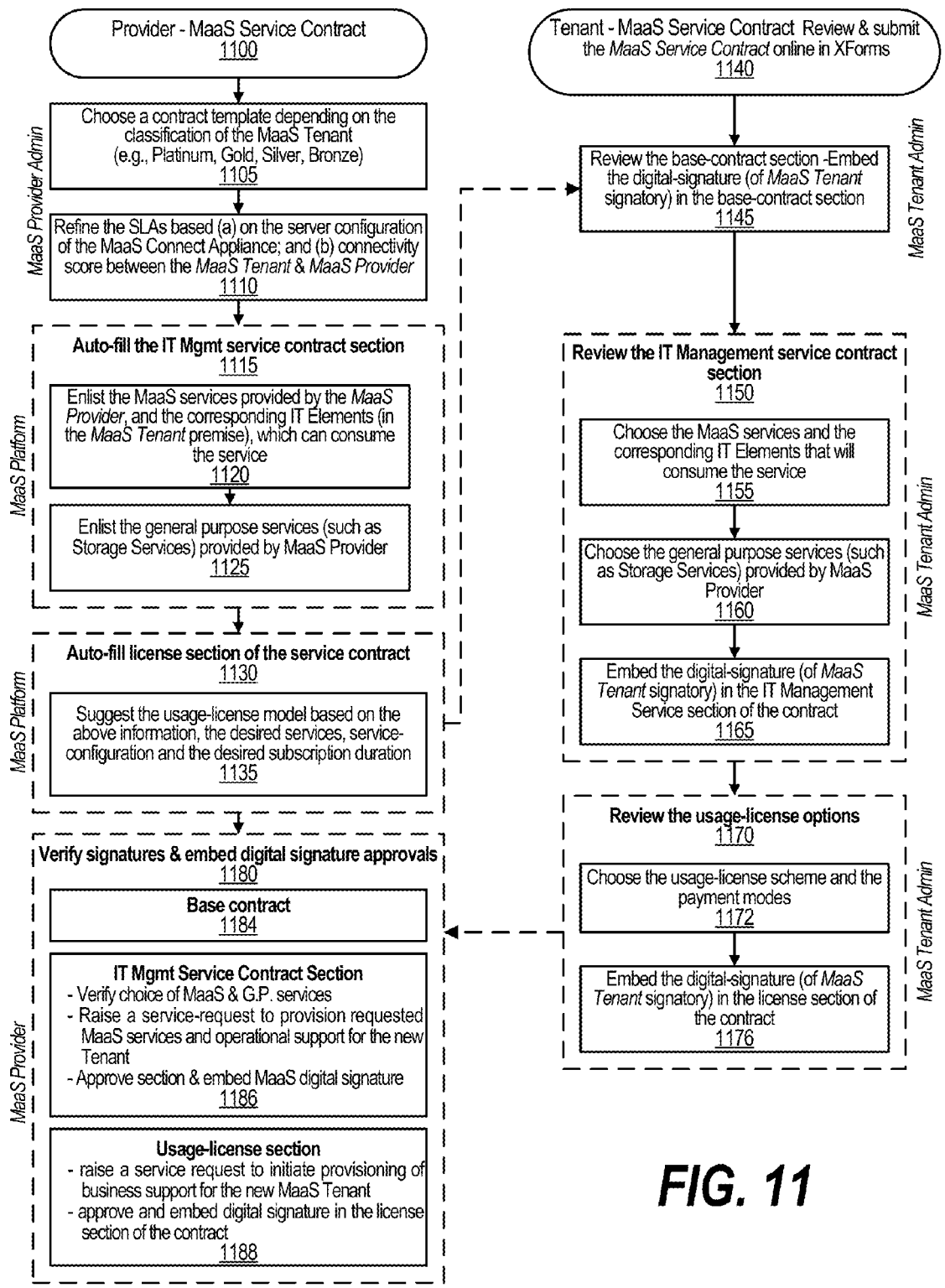
FIG. 11 is a flowchart showing interaction between and steps taken by MaaS Provider and MaaS tenant to establish the service contract.

FIG. 11 is a flowchart showing interaction between and steps taken by MaaS Provider and MaaS tenant to establish the service contract. MaaS Provider processing commences at 1100 whereupon, at step 1105, the MaaS Provider Admin chooses a contract template depending on the classification of the MaaS Tenant (e.g., Platinum, Gold, Silver, Bronze, etc.). At step 1110, the MaaS Provider Admin refines the SLAs based (a) on the server configuration of the MaaS Connect Appliance; and (b) connectivity score between the MaaS Tenant & MaaS Provider.

At 1115, the MaaS Platform auto-fills the IT Mgmt service contract section using the steps shown. At step 1120, the MaaS Platform enlists the MaaS services provided by the MaaS Provider, and the corresponding IT Elements (in the MaaS Tenant premise), which can consume the service. At step 1125, the MaaS Platform enlists the general purpose services (such as Storage Services) provided by MaaS Provider.

At 1130, the MaaS Platform auto-fills the license section of the service contract using the step shown. At step 1135, the MaaS Platform Suggest the usage-license model based on the above information, the desired services, service-configuration and the desired subscription duration.

MaaS Tenant processing commences at 1140 whereupon, at step 1145, the MaaS Tenant reviews the base-contract section and embeds the digital-signature (of MaaS Tenant signatory) in the base-contract section. At 1150, the MaaS Tenant reviews the IT management service contract section using the steps shown. At step 1155, the MaaS Tenant chooses the MaaS services and the corresponding IT Elements that will consume the service. At step 1160, the MaaS Tenant chooses the general purpose services (such as Storage Services) provided by MaaS Provider. At step 1165, the MaaS Tenant embeds the digital-signature (of MaaS Tenant signatory) in the IT Management Service section of the contract.

At 1170, the MaaS Tenant reviews the usage-license options using the steps shown. At step 1172, the MaaS Tenant chooses the usage-license scheme and the payment modes. At step 1175, the MaaS Tenant embeds the digital-signature (of MaaS Tenant signatory) in the license section of the contract.

Processing returns back to the MaaS Provider at 1180 with the MaaS Provider verifying the digital signatures and embedding digital signature approvals using the steps shown. At step 1084, the MaaS Provider verifies the digital signatures and embeds digital signature approvals in the base contract. At step 1086, the MaaS Provider verifies the digital signatures and embeds digital signature approvals in the IT management service contract section. Step 1086 includes verifying the tenant's choice of MaaS and general purpose services, raising a service-request to provision requested MaaS services and operational support for the new tenant, and approving the section by embedding the MaaS digital signature. At step 1088, the MaaS Provider verifies the digital signatures and embeds digital signature approvals in the usage-license section. Step 1188 includes raising a service request to initiate provisioning of business support for the new MaaS tenant, and approving the section by embedding the MaaS Provider's digital signature in the license section of the contract.

Figure 12:
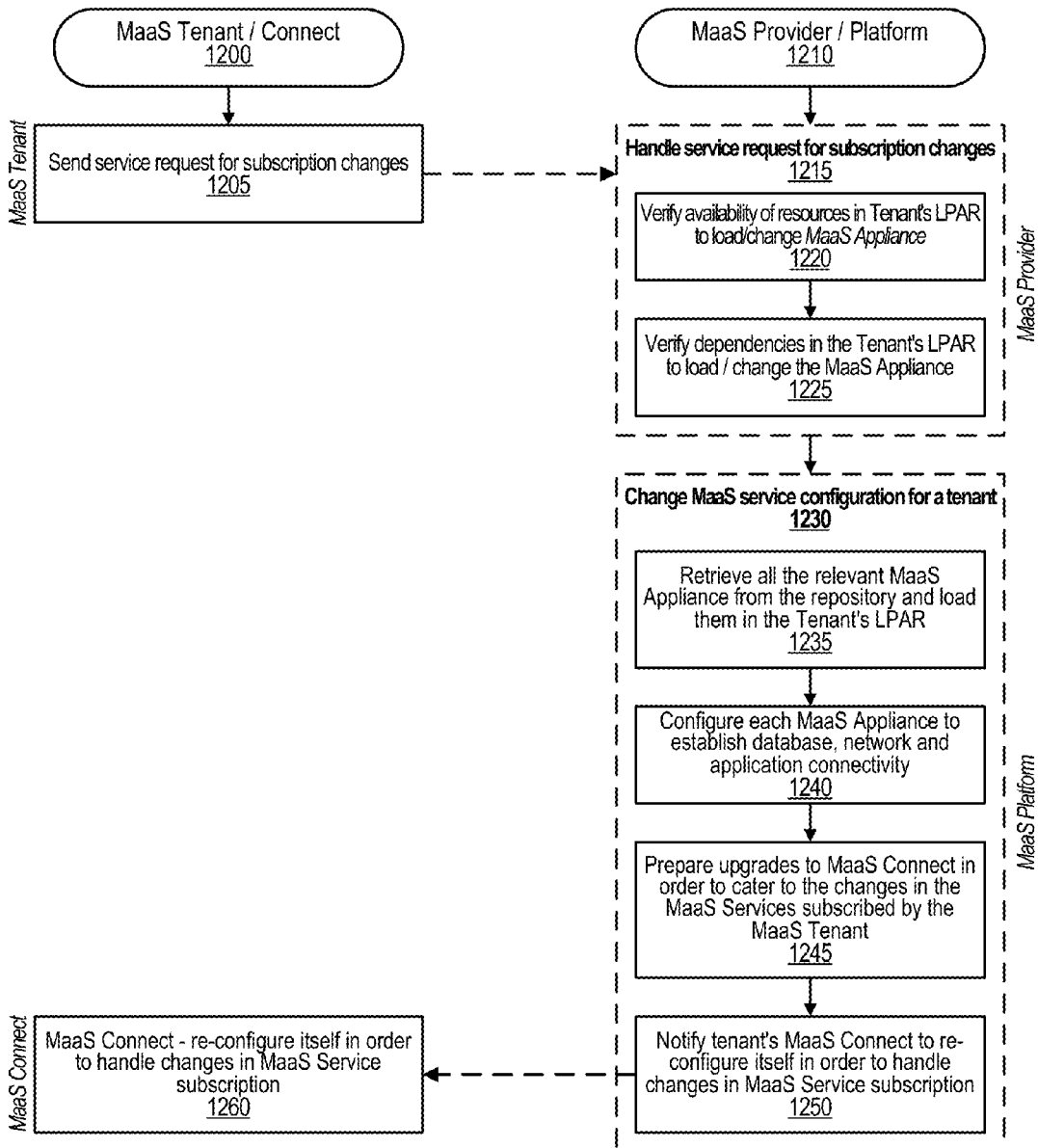
FIG. 12 is a flowchart showing interaction between and steps taken by MaaS Provider and MaaS tenant to manage subscription changes and change a tenant's service configuration.

FIG. 12 is a flowchart showing interaction between and steps taken by MaaS Provider and MaaS tenant to manage subscription changes and change a tenant's service configuration. MaaS Tenant (MaaS Connect) processing commences at 1200 whereupon, at step 1205, the MaaS tenant sends a service request for subscription changes to the MaaS Provider (MaaS Platform). MaaS Provider/Platform processing commences at 1210 with receipt of the MaaS tenant request.

At step 1215, the MaaS Provider/Platform handles the service request for subscription changes using the steps shown. At step 1220, the MaaS Provider/Platform verifies the availability of resources in Tenant's LPAR to load/change MaaS Appliance. At step 1225, the MaaS Provider/Platform verifies the dependencies in the Tenant's LPAR to load/change the MaaS Appliance.

At step 1230, the MaaS Provider/Platform changes the MaaS service configuration for the tenant using the steps shown. At step 1235, the MaaS Provider/Platform retrieves all the relevant MaaS Appliance from the repository and load them in the Tenant's LPAR. At step 1240, the MaaS Provider/Platform configures each MaaS Appliance to establish database, network and application connectivity. At step 1245, the MaaS Provider/Platform prepares upgrades to MaaS Connect in order to cater to the changes in the MaaS Services subscribed by the MaaS Tenant. At step 1250, the MaaS Provider/Platform notifies tenant's MaaS Connect to re-configure itself in order to handle changes in MaaS Service subscription.

Processing returns back to the MaaS Tenant (MaaS Connect) at 1260 upon receipt of the notification from the MaaS Provider/Platform. At step 1260, the MaaS Connect re-configures itself to handle changes in MaaS Service subscription.

Figure 13:
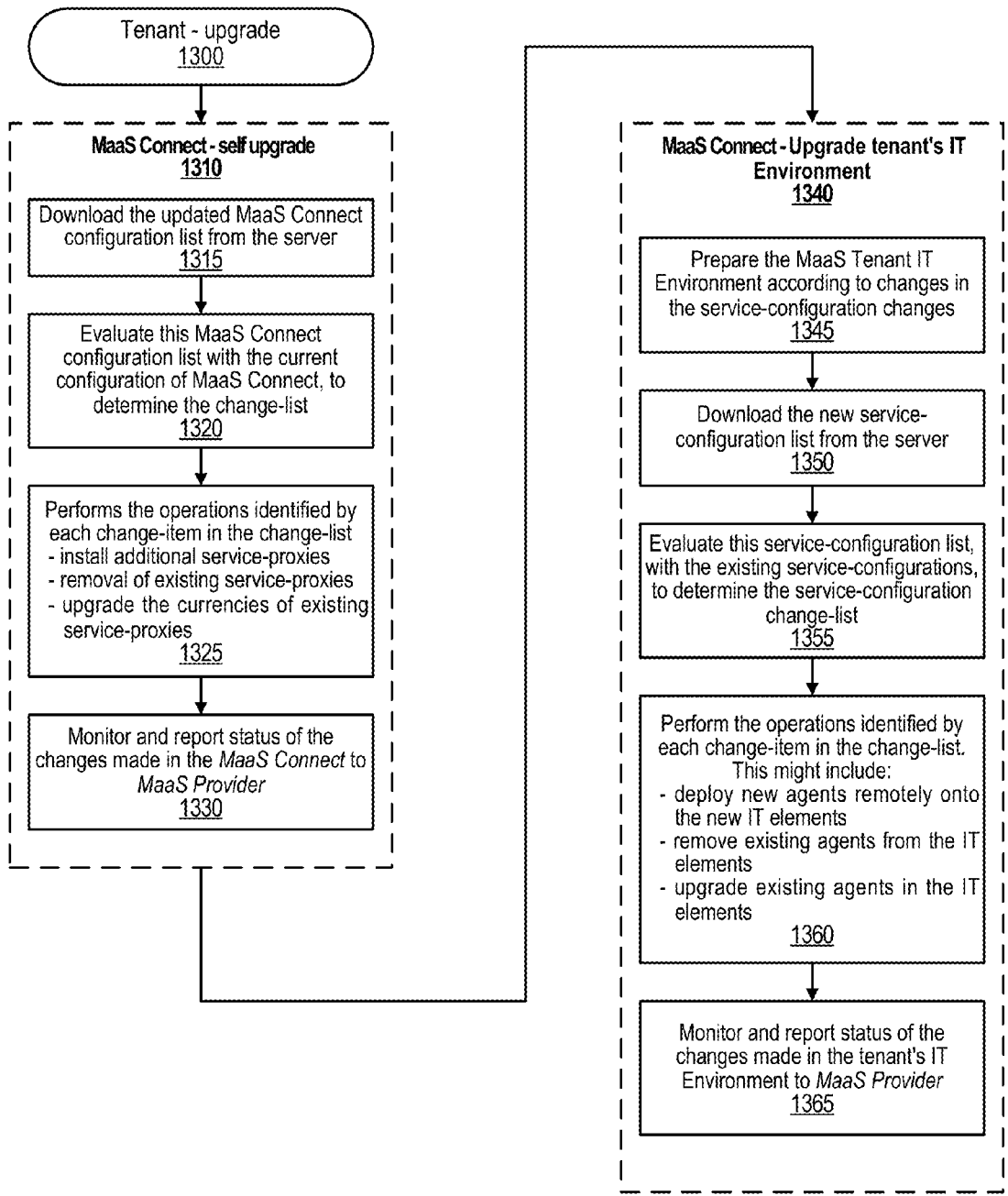
FIG. 13 is a diagram showing by tenant to upgrade MaaS Connect and upgrade the tenant's IT environment.

FIG. 13 is a diagram showing by tenant to upgrade MaaS Connect and upgrade the tenant's IT environment. Tenant upgrade processing commences at 1300 whereupon, at 1310, a number of steps are performed in order for the MaaS Connect appliance to "self upgrade" (upgrade itself). At step 1315, the updated MaaS Connect configuration list is downloaded from the server (e.g., the MaaS Provider). At step 1320, the MaaS Connect configuration that was received by the server in step 1315 is evaluated using the current configuration of the MaaS Connect appliance running in the tenant environment. This evaluation results in a change list. At step 1325, each of the operations identified by each of the items in the change list created in step 1320 is performed. These operations can include installing additional service-proxies, removing existing service-proxies, and upgrading the current existing service proxies. At step 1330, the tenant upgrade process monitors and reports the status of the changes made to the MaaS Connect appliance to the MaaS Provider.

Next, at 1340, the upgraded MaaS Connect appliance upgrades the tenant's IT environment using the steps shown. At step 1345, preparations are made to the tenant IT environment according to the changes in the service-configuration changes. At step 1350, the new service-configuration list is downloaded from the server (e.g., the MaaS Provider). At step 1355, the service-configuration list is evaluated using the existing service-configurations to determine the service-configuration change list. At step 1360, each of the operations identified in step 1355. These operations might include deploying new agents remotely onto the new IT elements, removing existing agents from the IT elements, and upgrading existing agents in the IT elements. At step 1365, the tenant upgrade process monitors and reports the status of the changes made in the tenant's IT environment to the MaaS Provider.

Figure 14A:
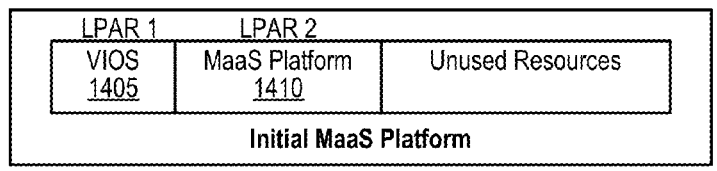
FIG. 14A is a diagram depicting a sample application where the MaaS Platform initial includes two LPARs.

FIG. 14A is a diagram depicting a sample application where the MaaS Platform initial includes two LPARs. In this specific example, server monitoring is provided as a service to the tenant. The provider sets up the MaaS Platform which consists of a cluster of p-series machines. The base operating system used might be running AIX™ operating system as it has several powerful features which support virtualization. One of these features amongst these is the support for the creation of LPARs (Logical Partitions). Each LPAR behaves as a separate virtual server running its own copy of AIX on it. The LPAR running the AIX as base OS, and the application stack on top of it is essentially a FBD (File Backed Device) and an image of the same can be stored in a file. Each LPAR is dedicated to a tenant and is allocated resources as per the needs of the tenant. These resources can be dynamically allocated or de-allocated. The creation of a LPAR is very rapid and it takes only a couple of minutes to create a new LPAR. All the LPARs are managed using the VIOS (Virtual Input-output server). The VIOS itself runs on a separate LPAR.

The MaaS Platform initially comprise of 2 LPARs (LPAR 1405 and LPAR 1410) as illustrated in FIG. 14A. LPAR 1405 is dedicated for the Virtual Input Output Server (VIOS) and the other is dedicated for MaaS Platform Management. The MaaS Platform Management LPAR also stores a repository of MaaS Appliance. Each MaaS Appliance is a workload-partition (WPAR) image which can be deployed in the tenant's LPAR on-demand. When a new tenant subscribes, the MaaS Platform creates a dedicated LPAR for it, allocating resources on the basis of the tenant's requirements and installs a base profile. The base-profile comprise of the operating-system, the agents for monitoring the health, metering etc. Following this, based on the tenant's subscription, the appropriate MaaS Appliance is retrieved from the repository and loaded onto the newly created LPAR.

Figure 14B:
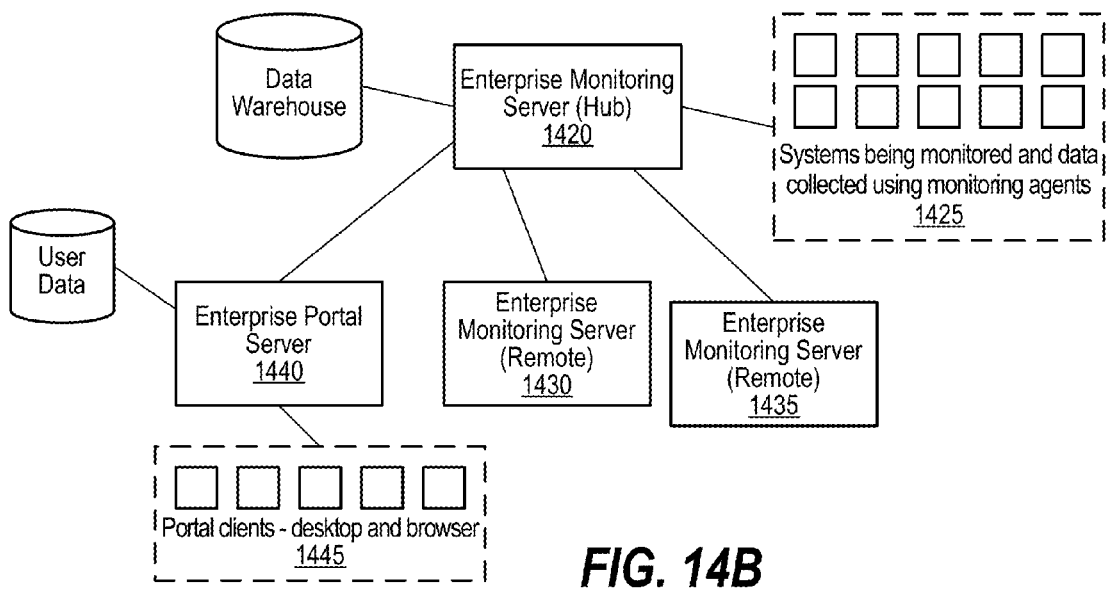
FIG. 14B is a diagram depicting a sample environment that utilizes the approach described in FIGS. 3 to 13.

FIG. 14B is a diagram depicting a sample environment that utilizes the approach described in FIGS. 3 to 13. In the example outlined in FIGS. 14A-14C, a product such as ITM™ (IBM Tivoli Monitoring) is used for providing server monitoring. The basic architecture of ITM is as shown in FIG. 14B. The architecture includes Enterprise Monitoring Server (Hub) 1420 that monitors systems 1425 using monitoring agents that collect data from the monitored systems. Remote Enterprise Monitoring Servers 1430 and 1435 can also be utilized by monitoring hub 1420. Enterprise Portal Server 1440 serves portal clients 1445 and also communicates with monitoring hub 1420.

Figure 14C:
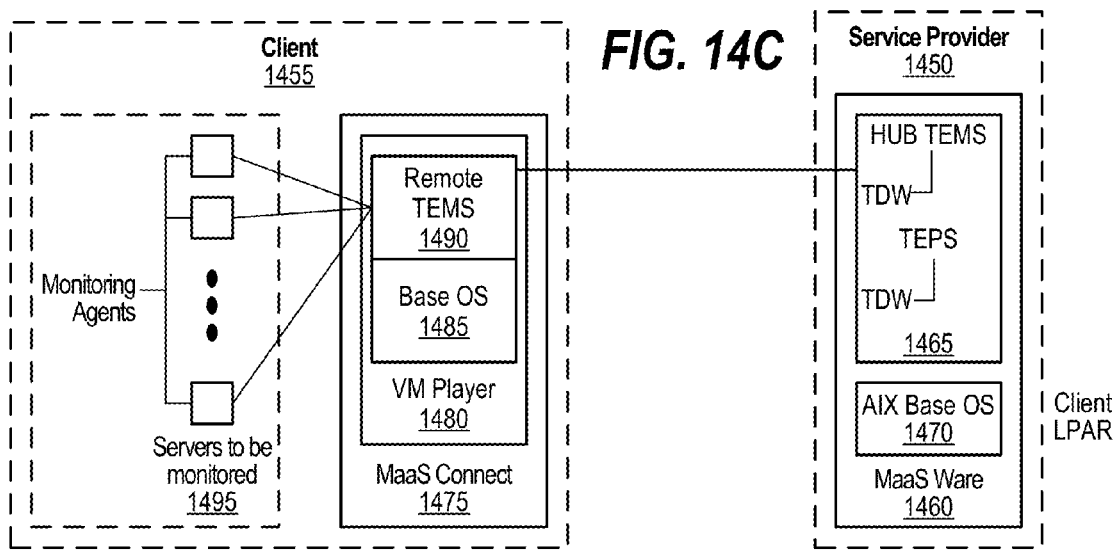
FIG. 14C is a diagram depicting the approach running with the MaaS Connect appliance providing a connection between the MaaS Provider and the MaaS Tenant.

FIG. 14C is a diagram depicting the approach running with the MaaS Connect appliance providing a connection between MaaS Provider 1450 and MaaS Tenant 1455. MaaS Ware 1460 includes MaaS Appliance 1465 and base operating system 1470. MaaS Appliance 1465 is loaded onto an LPAR for a specific client and, in one embodiment, has the following components: TEMS™ (Tivoli Enterprise Monitoring Server™—HUB), TDW™ (Tivoli Data Warehouser™), TEPS™ (Tivoli Enterprise Portal Server™). The HUB-TEMS is the component which is responsible for actually collecting the data and storing it in the TDW. The TEPS connects to this TEMS in order to store the data in a presentable form, and connects to a TDW of its own.

Once MaaS Appliance 1465 is provisioned, the next step is to provide a connection between MaaS Provider 1450 and MaaS Tenant 1455. This is done by using MaaS Connect appliance 1475 that has VM Player 1480 installed on it. The client downloads the virtual machine (VM ware) image and runs it on VM Player 1480. The MaaS Appliance includes operating system 1485 (such as a Linux™ operating system) as the base Operating System, with Remote TEMS 1490 installed. Remote TEMS 1490 is configured to connect to the appropriate Hub TEMS. Tivoli Monitoring Agents are remotely deployed on each client server 1495 that need to be monitored through this Remote TEMS. These agents collect monitoring data and send it to the Remote TEMS which then forwards it to the Hub TEMS. In one embodiment, all of the nodes of the workflow shown in FIG. 14C are implementable, hence providing implement-ability of the entire workflow process.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a computer system comprising:
    configuring a management-as-a-service (MaaS) connect process by a computer processor running at a MaaS provider, wherein the MaaS connect process is configured based on a request from a MaaS tenant;
    transmitting, via a network interface, the configured MaaS connect process to the MaaS tenant;
    providing one or more MaaS services from the MaaS provider to the MaaS tenant, wherein the provided MaaS services interact with the configured MaaS connect process installed at the MaaS tenant, and wherein the MaaS provider provides one or more MaaS service offerings;
    retrieving a capacity requirement corresponding to the one or more MaaS service offerings;
    matching a received list of one or more discovered tenant information technology (IT) elements with the one or more MaaS service offerings available from the MaaS provider;
    retrieving the capacity requirement corresponding to the one or more matched MaaS service offerings;
    receiving a capacity assessment of the tenant IT environment from the configured MaaS connect process;
    comparing the capacity requirement corresponding to the one or more matched MaaS service offerings to the received capacity assessment; and
    notifying the MaaS tenant in response to the comparison revealing that the capacity requirement corresponding to the one or more matched MaaS service offerings exceeds the received capacity assessment.

2. The method of claim 1 further comprising:
    prior to the providing of the one or more MaaS services:
        receiving the list of one or more discovered tenant information technology (IT) elements from the configured MaaS connect process running at the MaaS tenant.

3. The method of claim 2 further comprising:
    including the one or more matched MaaS services offerings in an offer to the MaaS tenant; and
    receiving a selection from the MaaS tenant corresponding to one or more of the matched MaaS service offerings, wherein the selection is the one or more MaaS services provided by the MaaS provider to the MaaS tenant.

4. The method of claim 3 further comprising:
    generating a MaaS service contract that includes the offer.

5. The method of claim 1 wherein the notification to the MaaS tenant includes an advisory based on the comparison wherein the advisory includes one or more IT improvement items targeted to improve the tenant IT environment.

6. The method of claim 1 further comprising:
remotely deploying one or more processes from the MaaS provider to the MaaS tenant using the configured MaaS connect process.

7. The method of 6 claim wherein the one or more processes include at least one set of remote management agent processes deployed at the MaaS tenant.

8. The method of claim 7 further comprising:
receiving, from the configured MaaS connect process, a plurality of monitoring data gathered by the remote management agent processes running on a plurality of computer systems operated by the MaaS tenant; and
managing the computer systems operated by the MaaS tenant based upon the received plurality of monitoring data.

9. An information handling system comprising:
one or more processors;
a memory that is accessible by at least one of the processors;
a network adapter that connects the information handling system to a computer network;
a nonvolatile data storage medium accessible by at least one of the processors; and
a set of instructions executed by one or more of the processors to perform actions of:
establishing a network connection between a management-as-a-service (MaaS) provider executing on the information handling system and a remote MaaS tenant computer system over the computer network via the network adapter;
configuring a management-as-a-service (MaaS) connect process at the MaaS provider, wherein the MaaS connect process is configured based on a request received from the MaaS tenant;
transmitting the configured MaaS connect process to the MaaS tenant via the established network connection;
providing one or more MaaS services from the MaaS provider to the MaaS tenant, wherein the provided MaaS services interact with the configured MaaS connect process installed at the MaaS tenant via the established network connection, wherein the MaaS provider provides one or more MaaS service offerings; and
retrieving a capacity requirement corresponding to the one or more MaaS service offerings;
matching a received list of one or more discovered tenant information technology (IT) elements with the one or more MaaS service offerings available from the MaaS provider;
retrieving the capacity requirement corresponding to the one or more matched MaaS service offerings;
receiving a capacity assessment of the tenant IT environment from the configured MaaS connect process;
comparing the capacity requirement corresponding to the one or more matched MaaS service offerings to the received capacity assessment;
notifying the MaaS tenant in response to the comparison revealing that the capacity requirement corresponding to the one or more matched MaaS service offerings exceeds the received capacity assessment.

10. The information handling system of claim 9 wherein the actions further comprise:
prior to the providing of the one or more MaaS services:
receiving the list of one or more discovered tenant information technology (IT) elements from the configured MaaS connect process running at the MaaS tenant.

11. The information handling system of claim 10 wherein the actions further comprise:
including the one or more matched MaaS services offerings in an offer to the MaaS tenant; and
receiving a selection from the MaaS tenant corresponding to one or more of the matched MaaS service offerings, wherein the selection is the one or more MaaS services provided by the MaaS provider to the MaaS tenant.

12. The information handling system of claim 11 wherein the actions further comprise:
generating a MaaS service contract that includes the offer.

13. The information handling system of claim 9 wherein the notification to the MaaS tenant includes an advisory based on the comparison wherein the advisory includes one or more IT improvement items targeted to improve the tenant IT environment.

14. The information handling system of claim 9 wherein the actions further comprise:
remotely deploying one or more processes from the MaaS provider to the MaaS tenant using the configured MaaS connect process.

15. The information handling system of 14 claim wherein the one or more processes include at least one set of remote management agent processes deployed at the MaaS tenant.

16. The information handling system of claim 15 wherein the actions further comprise:
receiving, from the configured MaaS connect process, a plurality of monitoring data gathered by the remote management agent processes running on a plurality of computer systems operated by the MaaS tenant; and
managing the computer systems operated by the MaaS tenant based upon the received plurality of monitoring data.

17. A computer program product stored in a computer-readable storage memory, comprising functional descriptive material that, when executed by an information handling system, causes the information handling system to perform actions that include:
configuring a management-as-a-service (MaaS) connect process at a MaaS provider, wherein the MaaS connect process is configured based on a request from a MaaS tenant;
transmitting the configured MaaS connect process to the MaaS tenant;
providing one or more MaaS services from the MaaS provider to the MaaS tenant, wherein the provided MaaS services interact with the configured MaaS connect process installed at the MaaS tenant, and wherein the MaaS provider provides one or more MaaS service offerings;
retrieving a capacity requirement corresponding to the MaaS service offerings;
matching a received list of one or more discovered tenant information technology (IT) elements with the one or more MaaS service offerings available from the MaaS provider;
retrieving the capacity requirement corresponding to the one or more matched MaaS service offerings;
receiving a capacity assessment of the tenant IT environment from the configured MaaS connect process;
comparing the capacity requirement corresponding to the one or more matched MaaS service offerings to the received capacity assessment; and
notifying the MaaS tenant in response to the comparison revealing that the capacity requirement corresponding to the one or more matched MaaS service offerings exceeds the received capacity assessment.

18. The computer program product of claim 17 wherein the functional descriptive material, when executed, causes the information handling system to perform additional actions comprising:
prior to the providing of the one or more MaaS services:
receiving the list of one or more discovered tenant information technology (IT) elements from the configured MaaS connect process running at the MaaS tenant.

19. The computer program product of claim 18 wherein the functional descriptive material, when executed, causes the information handling system to perform additional actions comprising:
including the one or more matched MaaS services offerings in an offer to the MaaS tenant; and
receiving a selection from the MaaS tenant corresponding to one or more of the matched MaaS service offerings, wherein the selection is the one or more MaaS services provided by the MaaS provider to the MaaS tenant.

20. The computer program product of claim 19 wherein the functional descriptive material, when executed, causes the information handling system to perform additional actions comprising:
generating a MaaS service contract that includes the offer.

21. The computer program product of claim 17 wherein the notification to the MaaS tenant includes an advisory based on the comparison wherein the advisory includes one or more IT improvement items targeted to improve the tenant IT environment.

22. The computer program product of claim 17 wherein the functional descriptive material, when executed, causes the information handling system to perform additional actions comprising:
remotely deploying one or more processes from the MaaS provider to the MaaS tenant using the configured MaaS connect process.

23. The computer program product of 22 claim wherein the one or more processes include at least one set of remote management agent processes deployed at the MaaS tenant.

24. The computer program product of claim 23 wherein the functional descriptive material, when executed, causes the information handling system to perform additional actions comprising:
receiving, from the configured MaaS connect process, a plurality of monitoring data gathered by the remote management agent processes running on a plurality of computer systems operated by the MaaS tenant; and
managing the computer systems operated by the MaaS tenant based upon the received plurality of monitoring data.

\* \* \* \* \*